(12) United States Patent
Ichinose et al.

(10) Patent No.: US 8,456,576 B2
(45) Date of Patent: Jun. 4, 2013

(54) SIGNAL PROCESSING APPARATUS, SIGNAL PROCESSING METHOD, AND PROGRAM

(75) Inventors: Tsutomu Ichinose, Tochigi (JP); Takashi Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 493 days.

(21) Appl. No.: 12/750,761

(22) Filed: Mar. 31, 2010

(65) Prior Publication Data
US 2010/0259674 A1   Oct. 14, 2010

(30) Foreign Application Priority Data

Apr. 8, 2009 (JP) .................. 2009-093924

(51) Int. Cl.
*H04N 5/14* (2006.01)

(52) U.S. Cl.
USPC ...... 348/571; 348/441; 348/576; 348/E9.045; 348/E5.062; 348/642; 348/396.1; 348/712; 348/708; 348/235; 382/162; 382/166

(58) Field of Classification Search
None
See application file for complete search history.

(56) References Cited

U.S. PATENT DOCUMENTS
2008/0068508 A1* 3/2008 Ichinose et al. ............... 348/642

FOREIGN PATENT DOCUMENTS
JP  2008-072594  3/2008

* cited by examiner

*Primary Examiner* — Jefferey Harold
*Assistant Examiner* — Omer Khalid
(74) *Attorney, Agent, or Firm* — Sony Corporation (57) ABSTRACT

A signal processing apparatus includes a lower-level region data detecting section detecting, in luminance data of an input video signal, luminance data corresponding to a value in a set lower-level region, and a data converting section converting a value of the luminance data corresponding to the lower-level region to a set conversion value.

9 Claims, 9 Drawing Sheets

SIGNAL PROCESSING APPARATUS, SIGNAL PROCESSING METHOD, AND PROGRAM

BACKGROUND OF THE INVENTION

1. Field of the Invention

The present invention relates to a signal processing apparatus for a video signal, signal processing method, and program causing the signal processing method to be executed.

2. Description of the Related Art

Japanese Unexamined Patent Application Publication No. 2008-72594 is an example of related art.

For example, in manufacturing a replay-only disk, such as a Blu-ray Disc® (also referred to below as BD) ROM (BD-ROM), an authoring system that creates contents to be recorded performs a predetermined compressing process on video materials.

Normally, video signal to be subjected to compression is not particularly subjected to data conversion in order to increase reproducibility of input luminance data.

SUMMARY OF THE INVENTION

However, at the time of high-definition video data compression, when luminance data of an original image has a changed component in a lower-level region, noise occurs after compression to cause degradation in image quality and, moreover, for example, decrease in compression efficiency.

That is, at the time of compression, since bits are allocated also to a portion where the luminance data value changes in low luminance-data-value region (lower-level region), the allocated bits of the entire image are dispersed. For this reason, the reproducibility of a portion where high reproducibility is sought is degraded, and noise occurs in the portion where the luminance data value changes in the lower-level region.

In an embodiment of the present invention, a portion where the input luminance data changes in the lower-level region is automatically detected, and the lower-level region data at that portion is converted to a set conversion value. With this, it is desirable to improve image quality by improving compression efficiency to increase the amount of allocated bits of the portion where reproducibility is desired to be increased.

A signal processing apparatus according to an embodiment of the present invention includes a lower-level region data detecting section detecting, in luminance data of an input video signal, luminance data corresponding to a value in a set lower-level region and a data converting section converting a value of the luminance data corresponding to the lower-level region to a set conversion value.

When the lower-level region data detecting section detects a predetermined number or more of pieces of luminance data corresponding to the lower-level region in a predetermined unit of luminance data, the data converting section converts a value of the luminance data corresponding to the lower-level region in the predetermined unit of luminance data to the conversion value.

The lower-level region is set to have a lower value in a predetermined range excluding an undershoot region of the luminance data.

The conversion value is a value among luminance data values included in the lower-level region.

The predetermined unit is a horizontal line unit configuring a frame of the video signal.

For luminance data of a part of a screen region in a frame of the video signal, the lower-level region data detecting section detects luminance data corresponding to a value in the lower-level region and the data converting section coverts a value of the luminance data corresponding to the lower-level region to the conversion value.

The signal processing apparatus further includes a compressing section compressing luminance data output from the data converting section.

A signal processing method according to an embodiment of the present invention includes the steps of detecting, in luminance data of an input video signal, luminance data corresponding to a value in a set lower-level region and converting a value of the luminance data corresponding to the lower-level region to a set conversion value.

A program according to an embodiment of the present invention causes an operation processing apparatus to execute each of the steps above.

In the embodiments of the present invention, by way of example, for a video signal to be compressed, the luminance signal value in the lower-level region is converted to the conversion value, thereby eliminating a data-value changed component that can become noise after compression.

According to the embodiments of the present invention, a portion where the input luminance data changes in the lower-level region is automatically detected, and the lower-level region data at that portion is converted to a set conversion value. Accordingly, image quality can be improved by improving compression efficiency to increase the amount of allocated bits of the portion where reproducibility is desired to be increased.

DESCRIPTION OF THE PREFERRED EMBODIMENTS

Embodiments of the present invention are described in the following order:
1. Authoring System
2. Video Signal as Process Target
3. Structure and Operation of Video Compressing Apparatus
4. Partial Adaptive Conversion
5. Modification Example and Program

1. Authoring System

Figure 3:
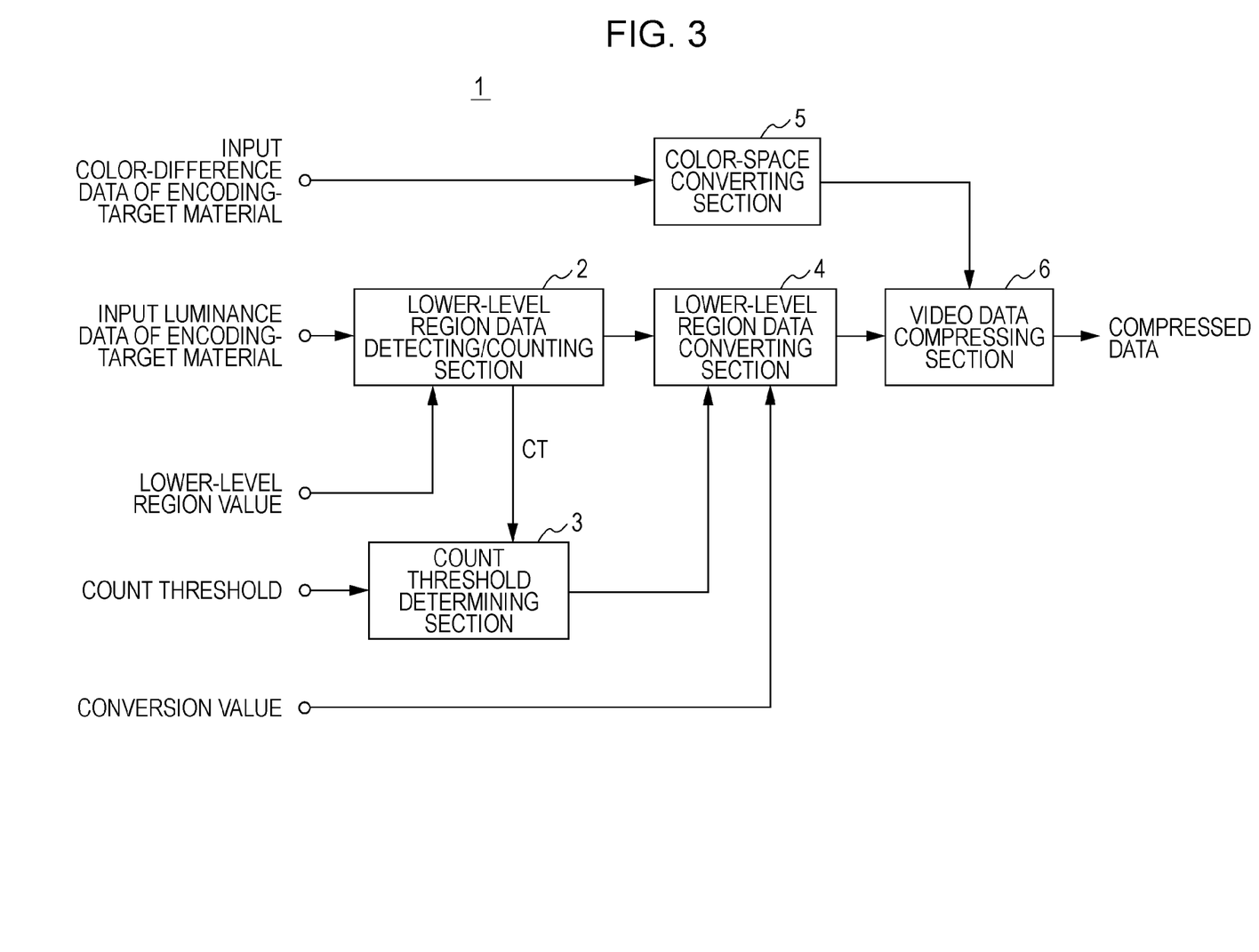
FIG. 3 is a block diagram of a video compressing apparatus according to the embodiment.

Prior to description of a video compressing apparatus 1 as an embodiment of a signal processing apparatus according to the present invention with reference to FIG. 3, an authoring system using the video compressing apparatus 1 is first described.

Figure 1:
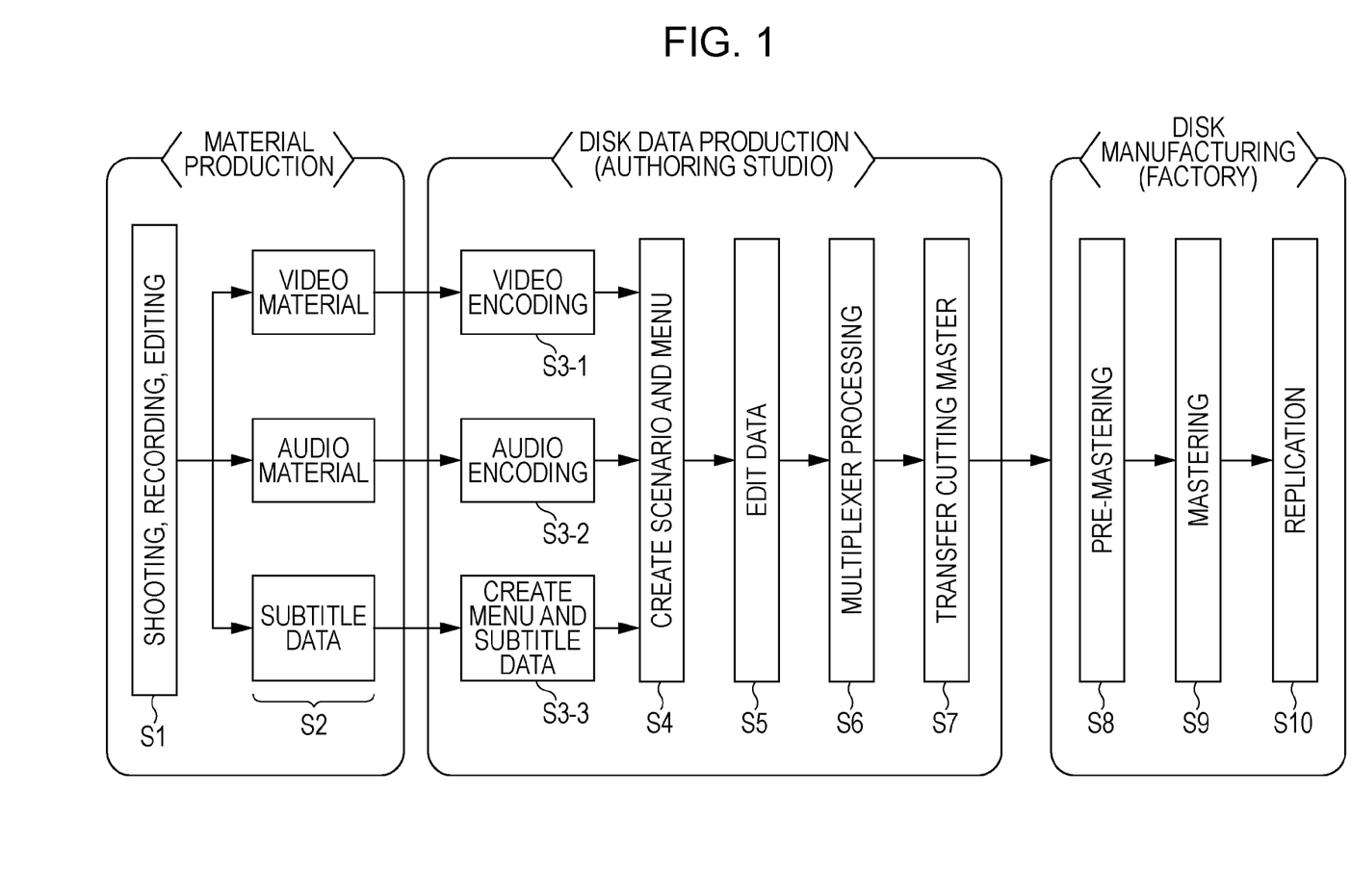
FIG. 1 illustrates an authoring system capable of adapting an embodiment of the present invention.

By way of example, a flow of manufacturing a replay-only Blu-ray Disc (BD-ROM) is described in FIG. 1.

First, as material production, shooting a video material and recording and editing an audio material are performed (S1).

Data obtained through these shooting, editing, and others is stored as material data of contents to be produced (video material, audio material, subtitle data, etc.) (S2).

Various material data are brought into an authoring studio for producing disk data (contents). For example, the material data is stored in an apparatus, such as a hard disk of a computer apparatus, configuring the authoring system.

In the authoring studio, the computer apparatus installed with a program for authoring and necessary hardware are used to produce contents by utilizing various material data.

The video material and the audio material are subjected to video encoding and audio encoding, respectively, each to be compressed and encoded to a predetermined format (S3-1 and S3-2). Here, when a high-definition image for use in a Blu-ray disc is compressed, a compression technique is used, such as moving picture experts group (MPEG)-2, advanced video cording (AVC), or VC-1. Also, a data format for compression is generally handled with 8 bits.

Furthermore, menu data, subtitle data, and others are created from the subtitle data and the like (S3-3).

These pieces of encoded material data are stored in, for example, the hard disk of the computer apparatus, for further content production.

A scenario and a menu as components of the contents are created (S4). Also, various data editing is performed (S5).

Then, as a multiplexer processing (S6), stream data configuring the contents is formed. The multiplexer processing is to multiplex the video data, the audio data, the menu, and others compressed and encoded with the MPEG2 scheme. In this case, a multiplexing process is performed by, for example, interleaving the encoded material data stored in the hard disk, such as images, audio, and subtitles and combining the data with various format file to create multiplexed data. Here, so-called clipping and creation of a UDF image are performed.

The eventually created multiplexed data is stored in, for example, the hard disk in the personal computer, as a cutting master for disk manufacturing.

This cutting master is sent to a factory for disk manufacturing (S7).

In the factory, as pre-mastering (S8), various data processes are performed, such as data encrypting and encoding disk recording data, to create mastering data. Then, as mastering (S9), processes from cutting a disk original master to creating a stamper are performed. Finally, as replication (S10), a disk substrate is created using the stamper, and a predetermined layer structure is formed on the disk substrate. Then, as a completed product, an optical disk (BD-ROM) is obtained.

In this disk manufacturing procedure, the signal processing apparatus, signal processing method, and program according to an embodiment of the present invention can be used for video encoding (S3-1) of compressing and encoding a video material. The video compressing apparatus 1 according to the embodiment is implemented as hardware or software as an apparatus that executes signal processing in video encoding (S3-1).

2. Video Signal as Process Target

The video compressing apparatus 1 of the present example described below performs data compression on a video signal complying with international telecommunication union radiocommunication sector (ITU-R) broadcasting service (television) (BT).709 (referred to below simply as BT.709). Here, a video signal of BT.709 is described.

For example, in a video camera or the like, a color signal obtained as a result of imaging is A/D converted, and color signals R, G, and B obtained as a result are subjected to primary-color conversion to color signals R, G, and B based on primary colors in BT.709.

The primary-color-converted color signals R, G, and B are corrected to color signals R, G, and B within a numerical-value range of 0 to 1.0 defined in BT.709.

That is, for example, color signals R, G, and B having a value smaller than 0 are corrected to those having a value of 0 (clipped), and color signals R, G, B having a value larger than 1.0 is corrected to those having a value of 1.0. It is assumed that in the numerical-value range of 0 to 1.0, 0 is a minimum value and 1.0 is a maximum value for the color signals R, G, and B complying with BT.709.

The color signals R, G, and B corrected to have a value in the numerical-value range of 0 to 1.0 are converted to color signals R, G, and B corrected with γ (non-linearity of light-emitting luminance with respect to the image signal) in a display mechanism in BT.709 according to photoelectric conversion characteristics complying with BT.709.

The photoelectric conversion characteristics are defined in a range from the minimum value to the maximum value of the color signals R, G, and B complying with BT.709, that is, in a range of 0 to 1.0.

The color signals R, G, and B corrected with γ (non-linearity of light-emitting luminance with respect to the image signal) are converted to a luminance signal Y and a color-difference signal CB/CR complying with BT.709.

The luminance signal Y obtained here has a value in the numerical-value range of 0 to 1.0 according to BT.709. Also, the color-difference signal CB/CR has a value in the numerical-value range of −0.5 to 0.5.

The luminance signal Y and the color-difference signal CB/CR converted by complying with BT.709 are represented by 8 bits.

Figure 2A:
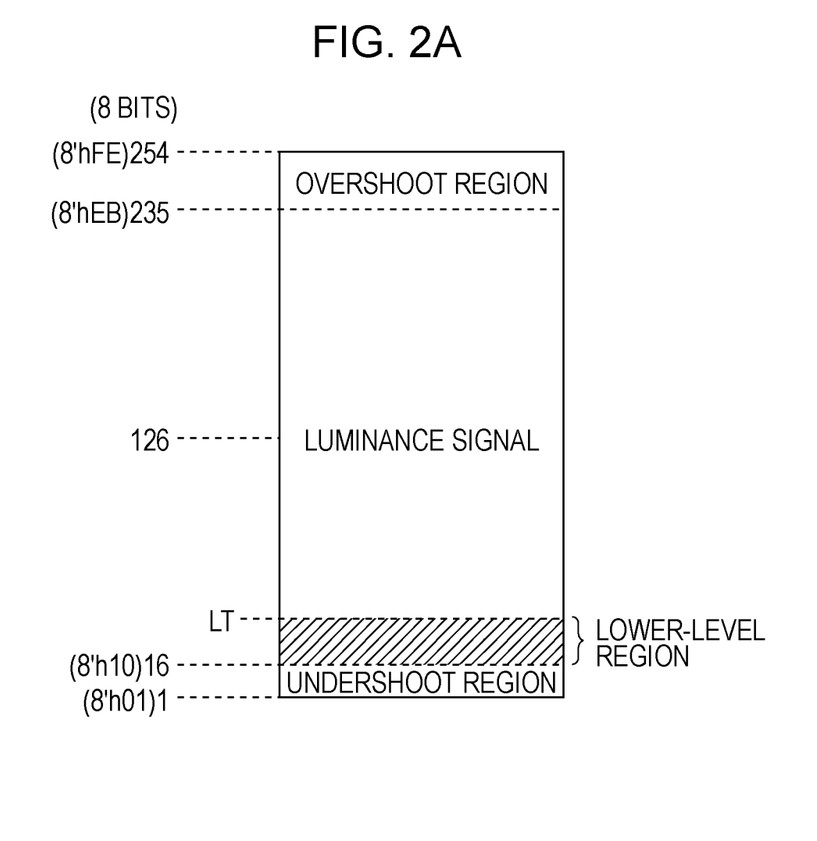
FIGS. 2A and 2B illustrate a video signal as a process target in the embodiment.

Specifically, the luminance signal Y in the numerical-value range of 0 to 1.0 is allocated with an integer value in an integer range of 16 (8'h10) to 235 (8'hEB), which is narrower than an integer range of 0 to 255 that can be represented by 8 bits, as depicted in FIG. 2A.

That is, the luminance signal Y is allocated with an integer value of 8 bits so as to provide an undershoot region of 1 to 15 and an overshoot region of 236 to 254.

A format of "x'h" represents an x-bit value and the numerical value of "" is in hexdecimal notation.

Figure 2B:
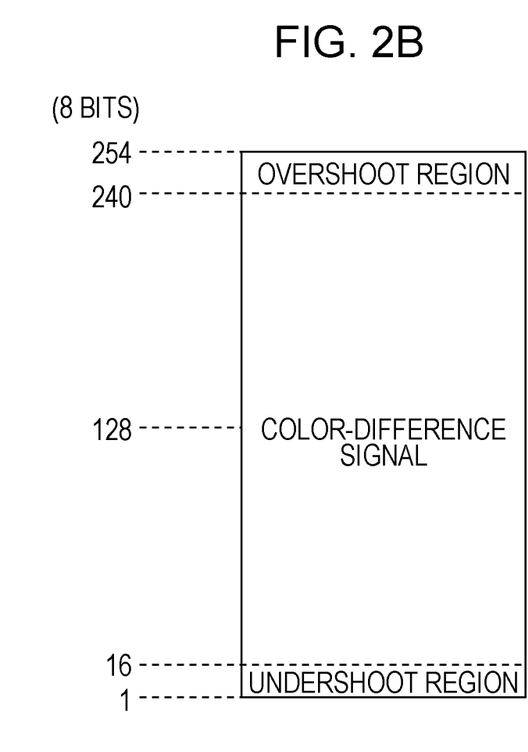

Also, the color-difference signal CB/CR in the numerical-value range of −0.5 to 0.5 is allocated with an integer value in an integer range of 16 to 240, which is narrower than an integer range of 0 to 255 that can be represented by 8 bits, as depicted in FIG. 2B.

That is, the color-difference signal CB/CR is allocated with an integer value of 8 bits so as to provide an undershoot region of 1 to 15 and an overshoot region of 241 to 254.

0 and 255 are not used in the luminance signal Y and the color-difference signal CB/CR.

The luminance signal Y with an integer value as described above is encoded as a luminance signal complying with BT.709 according to a predetermined format, for example, MPEG. Also, the color-difference signal CB/CR with an integer value as described above is encoded as a color-difference signal complying with BT.709 according to the same format as that of the luminance signal.

In video encoding (S3-1) of FIG. 1, the luminance signal and the color-difference signal complying with BT.709 depicted in FIGS. 2A and 2B are taken as process targets.

That is, the process targets are video data of 8 bits changing between "8'h01" to "8'hFE". Also, values in the undershoot region of "8'h01" to "8'h0F" and the overshoot region of "8'hEC" to "8'hFE" can be used for a luminance signal value and a color-difference signal value, but these values are not in the range of luminance signals and color-difference signals complying with BT.709.

3. Structure and Operation of Video Compressing Apparatus

The video compressing apparatus 1 of the present embodiment eliminates degradation in image quality and decrease in compression efficiency due to noise occurring after compression when luminance data of an image signal as a process target has a changed component in the lower-level region.

As described above, in the procedure of creating a Blu-ray disc, the luminance data of the original image as a video material has 8 bits changing between "8'h01" and "8'hFE". However, "8'h01" to "8'h0F" are at an undershoot level, and "8'hEC" to "8'hFE" are at an overshoot level.

Therefore, the luminance component of a video signal as a compression target changes in a range of "8'h10" to "8'hEB" when complying with BT.709.

Here, there are circumstances where even a subtle change of luminance data in the lower-level region in the range of "8'h10" to "8'hEB" is easy to visually detect.

When there is a component of luminance data complying with BT.709 changing only in the lower-level region, since the region is visually sensitive, noise may occur after compression even with a subtle change to degrade image quality. Moreover, this subtle change may also cause decrease in compression efficiency, thereby making it difficult to allocate bits to a portion where allocation compression bits are originally desired to be increased so as to improve reproducibility, and degrading the entire image.

The lower-level region is a region in a predetermined range (hatched portion) excluding the undershoot region of the luminance data as depicted in FIG. 2A, that is, a range of "8'h10" to "LT".

The upper limit "LT" of the lower-level region has, for example, "8'h17" ("23" in decimal notation).

In the video compressing apparatus 1 of the present embodiment, in view of degradation in image quality and decrease in compression efficiency, when there is a component of input luminance data changing in the lower-level region (for example, "8'h10" to "8'h17"), that component is automatically detected to be converted to a conversion value. With this, degradation in image quality after compression is eliminated, and also compression efficiency is improved.

FIG. 3 depicts the structure of the video compressing apparatus 1 of the present embodiment. Each block of this video compressing apparatus 1 may be configured as hardware. Also, for example, each block may be implemented as a software processing function with a computer apparatus for use in the above-described authoring system.

The video compressing apparatus 1 includes a lower-level region data detecting/counting section 2, a count threshold determining section 3, a lower-level region data converting section 4, a color-space converting section 5, and a video data compressing section 6.

To the lower-level region data detecting/counting section 2, luminance data of a video signal (video material) as a process target is input.

Also, to the lower-level region data detecting/counting section 2, a lower-level region is set. For example, with "8'h10" and "8'h17" being supplied to the lower-level region data detecting/counting section 2 as lower-level region setting values, the lower-level region data detecting/counting section 2 sets a range of "8'h10" to "8'h17" as a lower-level region.

The lower-level region data detecting/counting section 2 then performs a process of detecting whether each input luminance data value corresponds to the lower-level region of "8'h10" to "8'h17". When the value corresponds to the lower-level region, the lower-level region data detecting/counting section 2 performs a process of counting up a counter.

As to the input luminance data, after detecting whether the value corresponds to the lower-level region, the lower-level region data detecting/counting section 2 outputs the value as it is to the lower-level region data converting section 4.

Furthermore, the lower-level region data detecting/counting section 2 outputs a count value CT indicative of the number of values corresponding to the lower-level region to the count threshold determining section 3.

The count threshold determining section 3 determines, for example, for each line of the video signal, whether the count value CT from the lower-level region data detecting/counting section 2 is equal to or greater than a predetermined count threshold, and then determines execution or non-execution at the lower-level region data converting section 4.

The count threshold determining section 3 is set with a predetermined value as a count threshold. For example, when a video signal in which data of one frame is formed of 1920 pixels×1080 lines is taken as a target, "960", which is a half of the number of pixels, is taken as a count threshold, for example, for each line.

For example, when the count value CT for each line of the lower-level region data detecting/counting section 2 exceeds the count threshold, the count threshold determining section 3 determines execution of conversion of the lower-level region data. On the other hand, when the count value CT for each line is not greater than the count threshold, the count threshold determining section 3 determines non-execution of conversion of the lower-level region data.

The count threshold determining section 3 then provides, for each line, an instruction for executing or not executing data conversion to the lower-level region data converting section 4.

As described above, in the case of the count threshold=960, when the luminance data of 1920 pixels for one horizontal line includes luminance data values of a half or more of the pixels corresponding to the lower-level region, a data conversion executing instruction is issued.

The lower-level region data converting section 4 converts a data value according to an instruction from the count threshold determining section 3 for luminance data for each line supplied from the lower-level region data detecting/counting section 2.

That is, when the count threshold determining section 3 provides an instruction for executing conversion of the luminance data of 1920 pixels on a certain line, data conversion is performed on that line. Specifically, among 1920 pieces of luminance data on that line, a luminance data value corresponding to the lower-level region is converted to the conversion value set as a specific value.

The conversion value is a value included in the lower-level region of, for example, "8'h10" to "8'h17". For example, "8'h10" is set as a conversion value.

Then, among the pieces of luminance data on one line, those of luminance data included in the lower-level region of "8'h10" to "8'h17" are all converted to "8'h10" for output.

On the other hand, when the count threshold determining section 3 provides an instruction for not executing conversion of luminance data of 1920 pixels on a certain line, the lower-level region data converting section 4 does not perform data conversion on that line.

The lower-level region data converting section 4 supplies the converted (or unconverted) luminance data to the video data compressing section 6.

Information about which pixel among the luminance data on one line corresponds to the lower-level region, that is, information about which pixel value is to be converted, may be supplied from the lower-level region data detecting/counting section 2, or may be determined by the lower-level region data converting section 4 itself. For example, if the setting values of "8'h10" to "8'h17" of the lower-level region are supplied, the lower-level region data converting section 4 can determine whether each piece of luminance data is in the lower-level region for data conversion.

On the other hand, color-difference data as a process target is input to the color-space converting section 5. The color-space converting section 5 performs conversion of, for example, 4:2:2 to 4:2:0, and inputs color-difference data after process to the video data compressing section 6.

The video data compressing section 6 compresses the luminance data input from the lower-level region data converting section 4 and color-difference data input from the color-space converting section 5 to generate compressed data for output. The video data compressing section 6 performs compression of, for example, MPEG-2, AVC, or VC-1.

As described above, the lower-level region setting values are set to the lower-level region data detecting/counting section 2, the count threshold is set to the count threshold determining section 3, and the conversion value is set to the lower-level region data converting section 4. These lower-level region setting values, count threshold, and conversion value are supplied from a control section not shown (such as a microcomputer), when each section of FIG. 3 has a hardware structure. When each section is implemented as software, the lower-level region setting values, count threshold, and conversion value are set by an application for video encoding for video compression.

A specific example of a process by the above-described video compressing apparatus 1 is described with reference to FIGS. 4, 5A and 5B.

Figure 4:
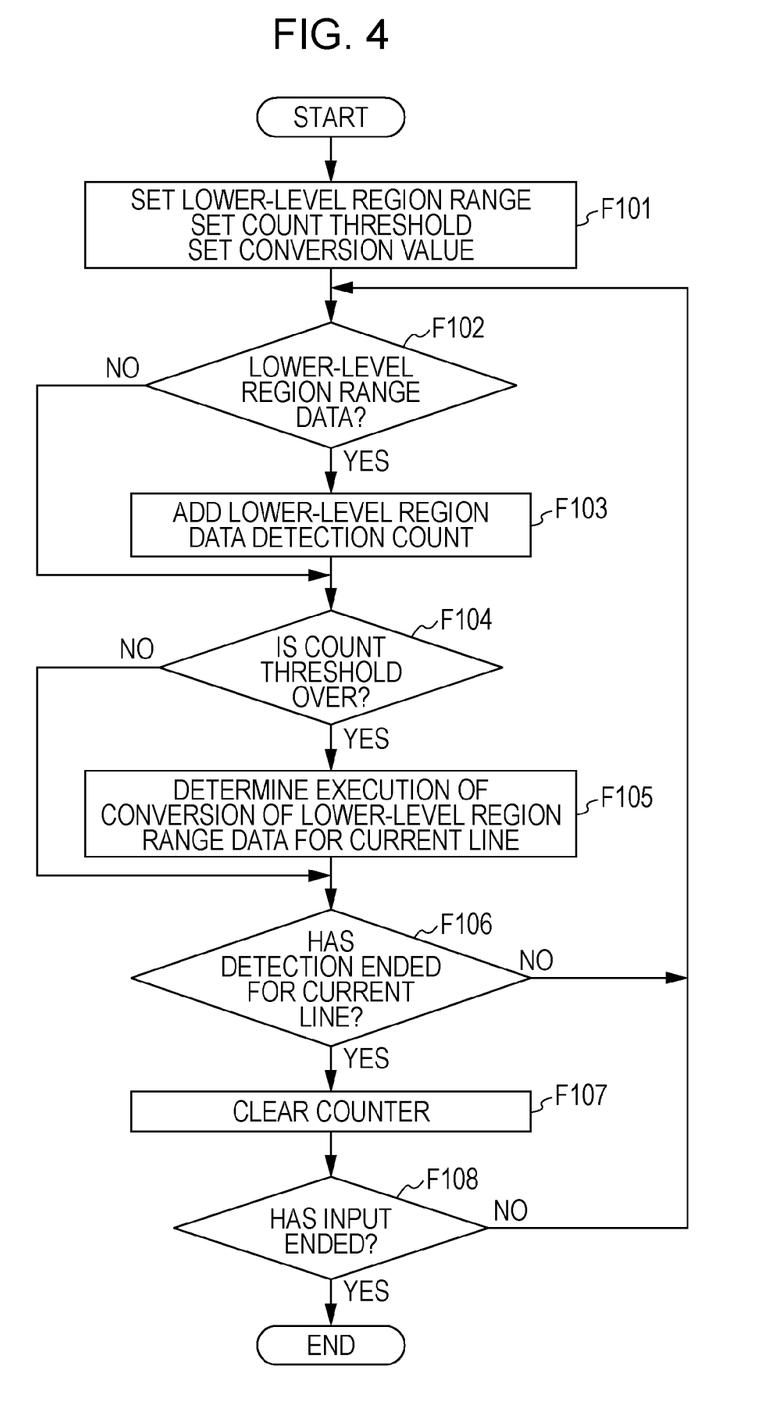
FIG. 4 is a flowchart of signal processing in the embodiment.

FIG. 4 depicts a process for each line executed mainly by the lower-level region data detecting/counting section 2, the count threshold determining section 3, and the lower-level region data converting section 4.

An example is described where one frame of a video signal is configured of 1920 pixels×1080 lines.

First at step F101, lower-level region setting values, a count threshold, and a conversion value are set as preparation to signal processing.

For example, when each section is formed as a software function block, according to inputs of setting values by an authoring operator or the like on a compression application program, the application program supplies the setting values to the respective sections. Alternatively, when each section has a hardware structure, the control section not shown supplies the setting values to the respective sections of FIG. 3 according to operator's inputs.

The lower-level region data detecting/counting section 2 then sets a range of luminance data values as a lower-level region according to the supplied lower-level region setting values. For example, "8'h10" to "8'h17" are set as a lower-level region.

Also, the count threshold determining section 3 sets a count threshold. For example, a count threshold is set to 960.

Furthermore, the lower-level region data converting section 4 sets a conversion value. For example, a conversion value is set to "8'h10".

Processes from steps F102 to F106 are executed for each line until input of luminance data ends at step F108.

At step F102, the lower-level region data detecting/counting section 2 determines whether the input luminance data value corresponds to the lower-level region.

When the value corresponds to the lower-level region, a count value is counted up at step F103.

At step F104, the count threshold determining section 3 monitors the count value CT of the lower-level region data detecting/counting section 2. That is, the count value CT and the count threshold are compared with each other to determine whether the count value CT is equal to or greater than the count threshold.

The procedure directly goes to step F106 until the count value CT becomes equal to or greater than the count threshold. Then, at step F106, the lower-level region data detecting/counting section 2 branches the process depending on whether the determination process (step F102) has ended for one line (=1920 pixels).

If the process for one line has not ended, the procedure returns to step F102 for similar processes.

That is, in the processes at steps F102 to F106, the lower-level region data detecting/counting section 2 counts the number of pieces of data corresponding to the lower-level region for the luminance data values for each pixel on one line.

Then, when the count value CT becomes equal to or greater than the count threshold, the process by the count threshold determining section 3 goes from step F104 to step F105, where it is determined that level conversion is performed regarding luminance data for a current line.

In this case, the count threshold determining section 3 provides the lower-level region data converting section 4 with an instruction for executing conversion.

To the lower-level region data converting section 4, luminance data forming each one line is transferred from the lower-level region data detecting/counting section 2. When an instruction for execution of conversion comes from the count threshold determining section 3, luminance data values corresponding to the lower-level region from among the luminance data values for 1920 pixels for the current line are converted to the conversion value of "8'h10". Then, the conversion result is output to the subsequent stage of the video data compressing section 6.

On the other hand, when it is determined that the count value CT does not exceed the count threshold until detection ends for the current line at step F106, the procedure does not proceed to step F105 for the current line. That is, a conversion instruction for the current line is not provided to the lower-level region data converting section 4. In this case, the lower-level region data converting section 4 outputs the luminance data values for 1920 pixels for the current line transferred from the lower-level region data detecting/counting section 2 are output all as they are without conversion to the subsequent stage of the video data compressing section 6.

When it is determined at step F106 that detection has ended for the current line, the procedure goes to step F107, where the lower-level region data detecting/counting section 2 clears the count value as the counter CT=0. Then, the procedure returns from step F108 to step F101, where the process on the input of the luminance data on the next line is subsequently executed.

The above-described processes are repeated until input of the video data ends.

Figure 5A:
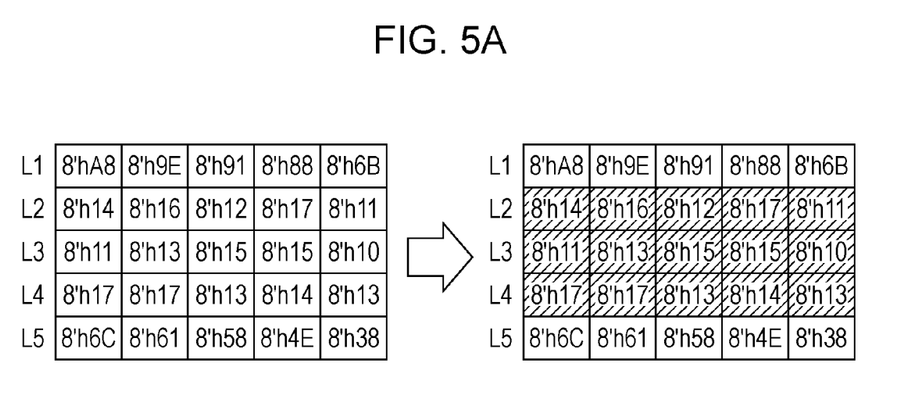
FIGS. 5A and 5B illustrate images in signal processing according to the embodiment.
Figure 5B:
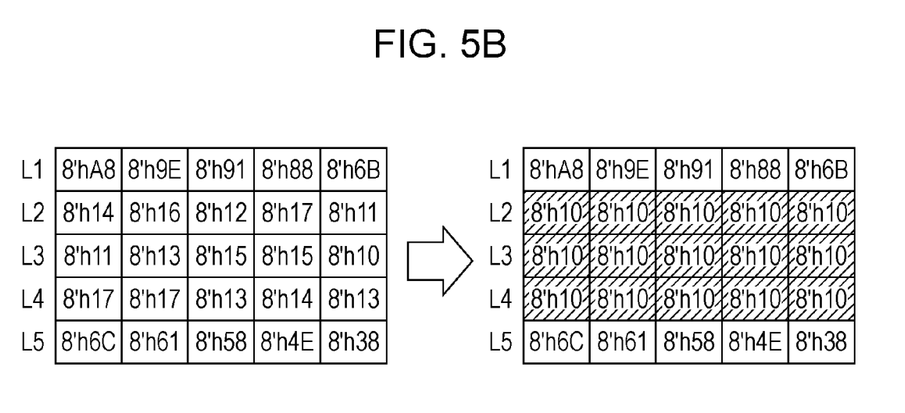

An image of signal processing executed by the above-described processes is depicted in FIGS. 5A and 5B.

Each of lines L1 to L5 in FIGS. 5A and 5B is a horizontal line configuring one frame of a video signal, and one line has five pixels in this model.

On the left of FIG. 5A, luminance data values on the respective input lines L1 to L5 are shown. On the right of FIG. 5A, pixels corresponding to the lower-level region are hatched on each line.

For example, the luminance data values of all pixels on the lines L1 and L5 do not correspond to the lower-level region, and the luminance data values of all pixels on the lines L2, L3, and L4 correspond to the lower-level region.

In this case, for each of the lines L2, L3, and L4, data conversion is performed by the lower-level region data converting section 4 as depicted in FIG. 5B.

On the left of FIG. 5B, luminance data values input to the lower-level region data converting section 4 are shown (identical to those on the left of FIG. 5A). On the right of FIG. 5B, luminance data values output from the lower-level region data converting section 4 are shown.

As for the lines L1 and L5, since no instruction for conversion is provided from the count threshold determining section 3, the input luminance data is output as it is.

As for the lines L2 to L4, since the luminance data values of all pixels correspond to the lower-level region, as depicted as a hatched portion, the luminance data values of all pixels are converted to the conversion value "8'h10" for output.

Figure 6A:
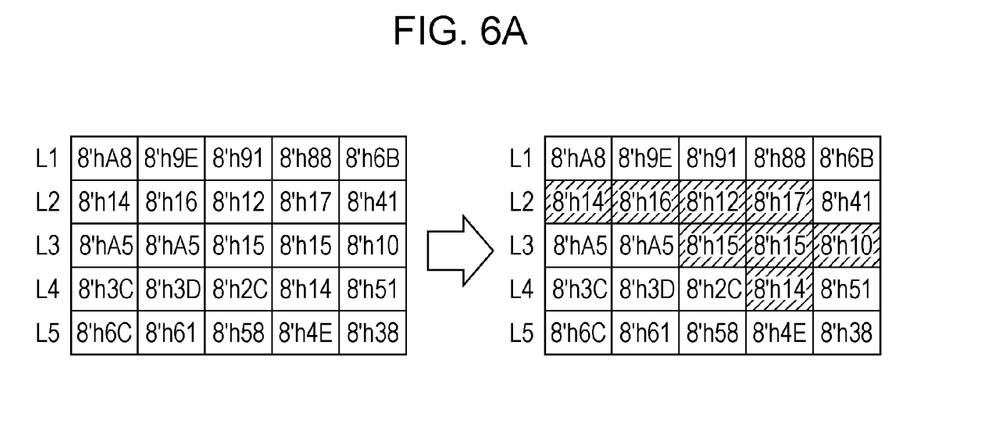
FIGS. 6A and 6B illustrate images in signal processing according to the embodiment.
Figure 6B:
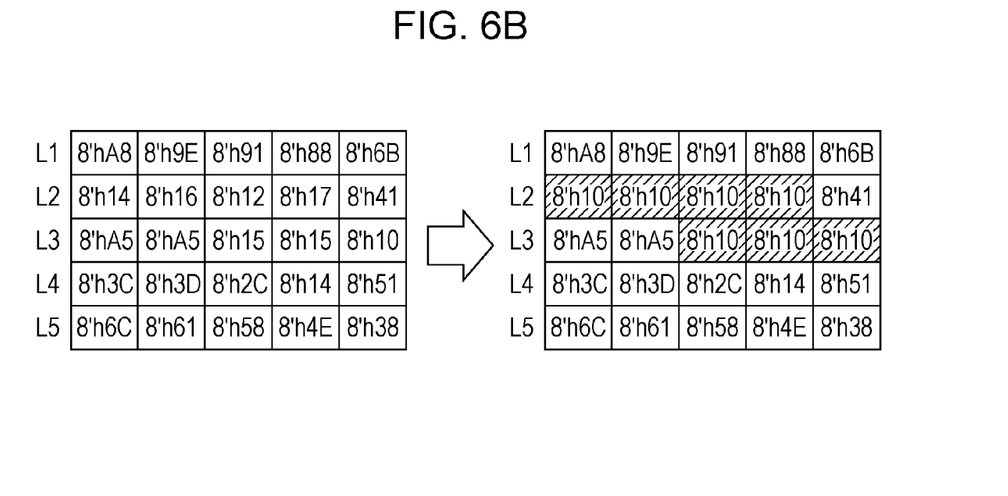

FIGS. 6A and 6B illustrate the case where a part of the luminance data values in lines corresponds to the lower-level region.

On the left of FIG. 6A, luminance data values on the respective input lines L1 to L5 are shown. On the right of FIG. 6A, pixels corresponding to the lower-level region are hatched on each line.

For example, the luminance data values of all pixels on the lines L1 and L5 do not correspond to the lower-level region, and the luminance data values of the hatched pixels on the lines L2 to L4 correspond to the lower-level region.

In this case, for each of the lines L2, L3, and L4, data conversion is performed by the lower-level region data converting section 4 as depicted in FIG. 6B.

On the left of FIG. 6B, luminance data values input to the lower-level region data converting section 4 are shown (identical to those on the left of FIG. 6A). On the right of FIG. 6B, luminance data values output from the lower-level region data converting section 4 are shown.

As for the lines L1 and L5, since no instruction for conversion is provided from the count threshold determining section 3, the input luminance data is output as it is.

As for the line L2, the luminance data values of four pixels correspond to the lower-level region. When it is determined that these values are equal to or greater than the count threshold, an instruction for data conversion is provided from the count threshold determining section 3 to the lower-level region data converting section 4. Therefore, as depicted a hatched portion, the luminance data values of the pixels corresponding to the lower-level region are converted to the conversion value "8'h10" for output.

As for the line L3, the luminance data values of three pixels correspond to the lower-level region. When it is determined that these values are equal to or greater than the count threshold, an instruction for data conversion is provided from the count threshold determining section 3 to the lower-level region data converting section 4. Therefore, as depicted a hatched portion, the luminance data values of the pixels corresponding to the lower-level region are converted to the conversion value "8'h10" for output.

As for the line L4, the luminance data value of one pixel corresponds to the lower-level region. When this value is smaller than the count threshold, no instruction for data conversion is provided to the lower-level region data converting section 4. Therefore, the luminance data values of all pixels are output as they are without conversion.

In the present embodiment, data conversion is performed as described above.

As such, in this example, when the number of pieces of luminance data in the lower-level region detected in a predetermined segment (within one line) of the input luminance data is equal to or greater than the number set as a count threshold, the luminance data in the lower-level region data in that segment is converted to the set value for compression. With this, compression efficiency of the portion of the luminance data in the lower-level region is improved. With an increase in the bit allocation amount of high-frequency components for which reproducibility is ensured, image quality of the system can be improved.

Also, conversion is performed when the set number or more of pieces of luminance data are detected in the lower-level region, thereby preventing indiscriminate conversion to the conversion value. That is, data conversion is appropriately performed on a portion where the luminance data value corresponding to the lower-level region has a large changing component and noise occurs after compression. As for a portion where noise is less likely to occur, the original value can be output without data conversion.

Although detection of a luminance data value corresponding to the lower-level region and data conversion are performed for each line in the above example, this is not meant to be restrictive.

For example, detection of a luminance data value corresponding to the lower-level region may be performed for one entire frame, and when the number of luminance data values corresponding to the lower-level region is equal to or greater than the count threshold, the luminance data values corresponding to the lower-level region may be converted to the conversion value. As a matter of course, the count threshold is set according to all pixels of the frame.

Furthermore, the process may be performed for a plurality of lines or for part of one line (for example, 1/n line). Still further, one frame may be divided into a plurality of blocks, and the process may be performed for each block. The count threshold is set according to the total number of pixels of a target unit.

4. Partial Adaptive Conversion

As another embodiment, an example of partial adaptive conversion is described.

In the above example, whether the luminance data value corresponds to the lower-level region is determined for the entire screen for data conversion.

Here, an example is described in which whether the luminance data value corresponds to a value in the lower-level region is detected only for a part of the screen region in a frame of a video signal for data conversion.

Figure 7A:
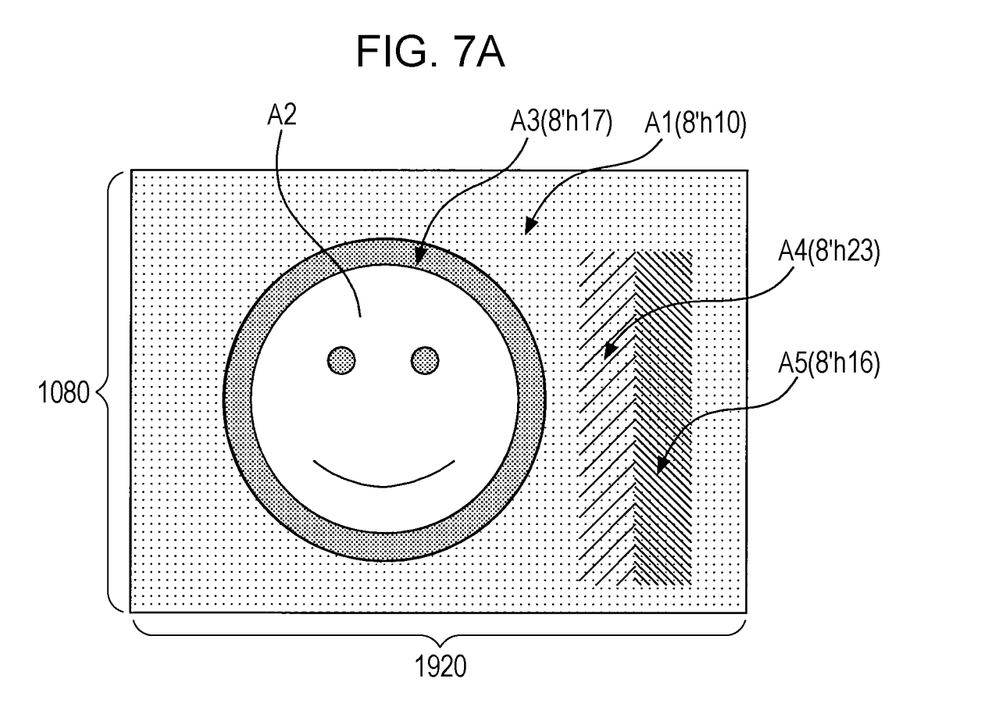
FIGS. 7A and 7B illustrate partial adaptive conversion according to the embodiment.

An image example is depicted in FIG. 7A. In this example, it is assumed that a background image A1, an image A2, a noise image A3, and images A4 and A5 are shown.

Here, it is assumed that the background A1 has a luminance data value of "8'h10".

It is also assumed that the noise image A3 has a luminance data value of, for example, "8'h17", that corresponds to the lower-level region.

It is assumed that the image A4 has a luminance data value of "8'h23".

It is assumed that the image A5 has a luminance data value of "8'h16", corresponding to the lower-level region.

Figure 8A:
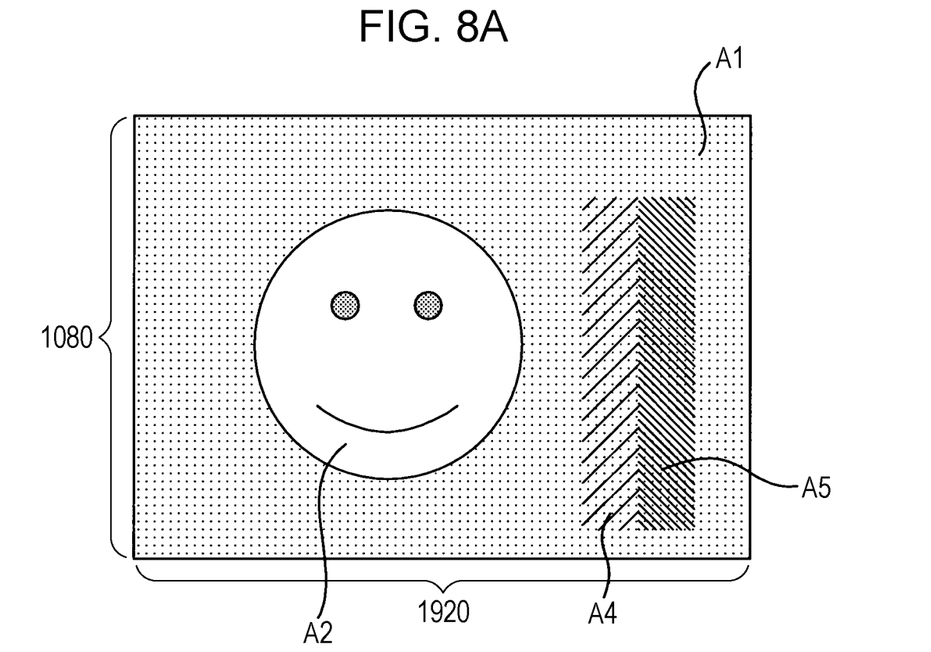
FIGS. 8A and 8B illustrate partial adaptive conversion according to the embodiment.
Figure 8B:
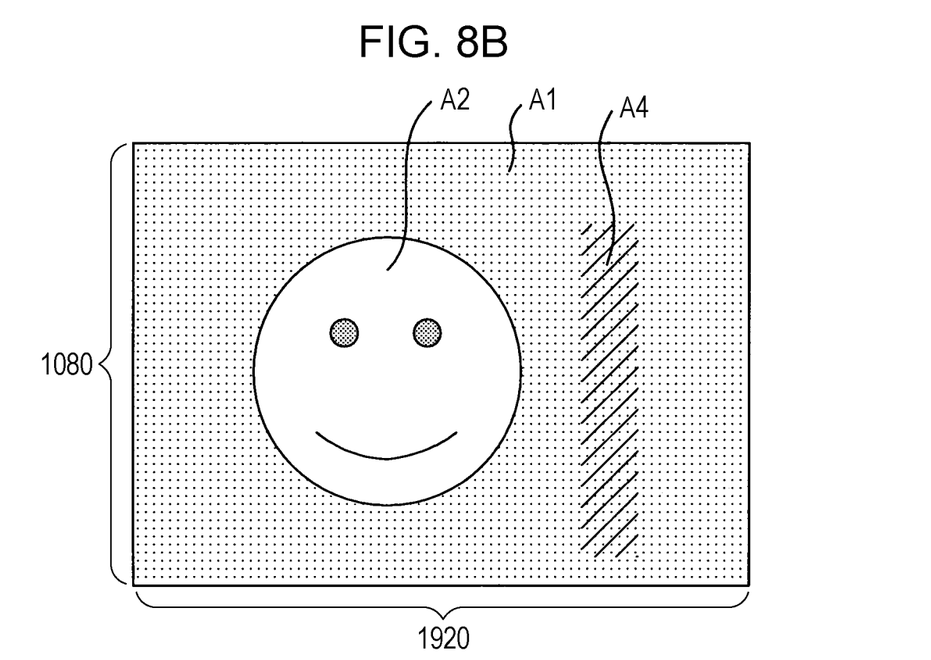

Here, when it is assumed that detection of a luminance data value and data conversion are performed for the entire frame as a target, the state may become as depicted in FIG. 8B.

That is, the luminance data value of the noise image A3 is changed from "8'h17" to the conversion value of, for example, "8'h10". With this, the noise image surrounding the image A2 disappears.

However, since the image A5 also has a value corresponding to the lower-level region, the luminance data value of each pixel of the image A5 is converted to the conversion value of "8'h10". As a result, as depicted in FIG. 8B, the image A5 disappears.

Here, as described above, by appropriately setting the count threshold and appropriately selecting a process target by line, by block, by 1/n line, by frame, or others, such loss of a necessary image can be prevented. However, to completely eliminate the loss of a necessary image, it is suitable not to apply the process in the embodiment of the present invention to a part of the screen.

Figure 7B:
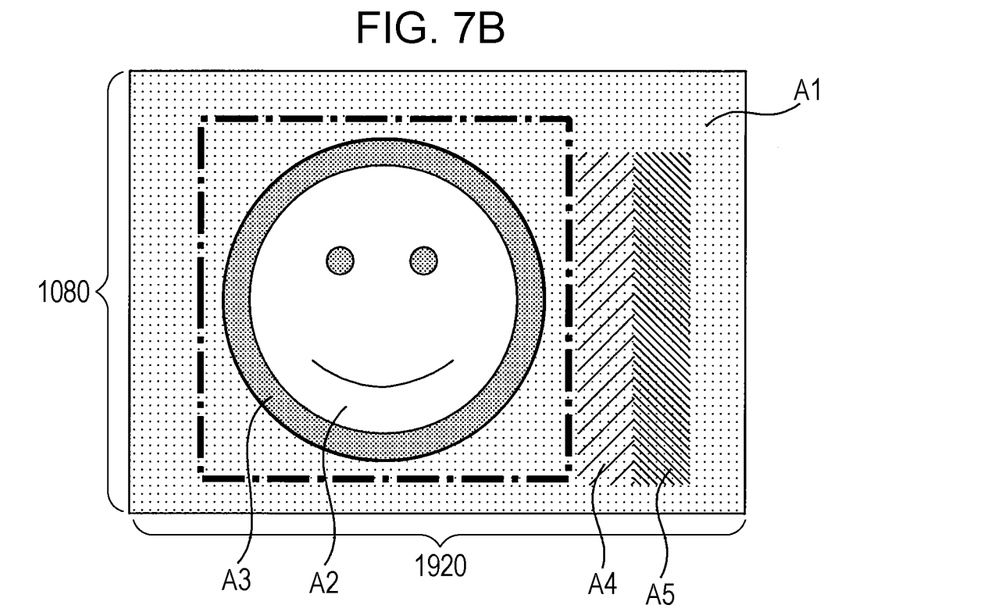

Thus, as partial adaptive conversion, a specific region as indicated by a one-dot-chain line in FIG. 7B can be set as a process target. Then, only for this specific region, detection of whether the luminance data value corresponds to the lower-level region and data conversion according to the relevant number are performed. With this, the state can be, for example, as depicted in FIG. 8A.

That is, the luminance data value of the noise image A3 is converted to the conversion value of "8'h10", and the noise image surrounding the image A2 disappears. On the other hand, since the image A5 is not a process target, no data conversion is performed at all, and the image A5 is not lost.

To perform this process, information about a specific region as a process target is set to the lower-level region data detecting/counting section 2 and the lower-level region data converting section 4, and the process is performed only on the luminance data in the range of the specific region as a process target.

5. Modification Example and Program

Embodiments of the present invention are not restricted to be those described above, and various modification examples can be made.

The lower-level region is not restricted to "8'h10" to "8'h17", and various setting examples can be thought, for example, "8'h10" to "8'h22".

Also, the count threshold is not restricted to a half of the number of pixels as a unit of process target (for example, one line), but can be ¾, ⅔, ⅓, ¼, or the like. In some cases, the count threshold may be set as 1. That is, conversion may be performed on the unit of process when even one luminance data value corresponding to the lower-level region is present in the unit of process target.

In the above example, the video signal is handled with 8 bits. Alternatively, an embodiment of the present invention can be applied also to the case of another number of bits, such as 10 bits.

Figure 9:
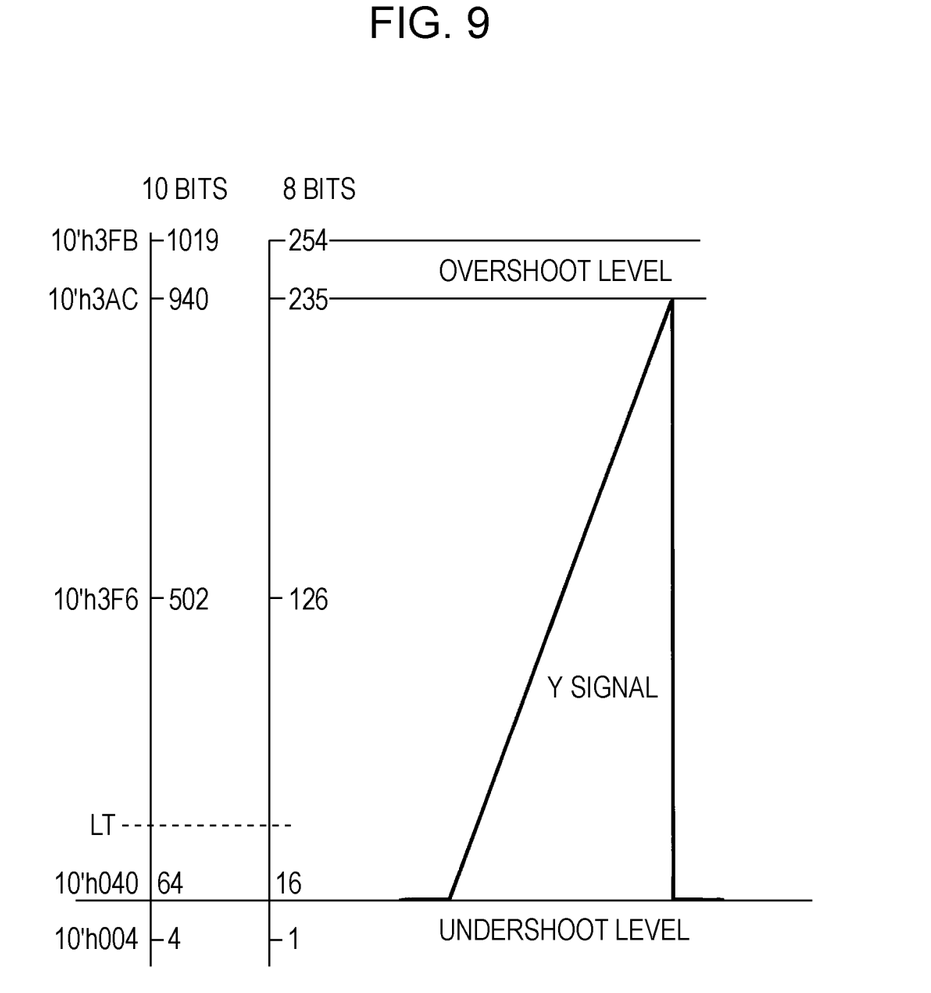
FIG. 9 illustrates the case where a video signal as a process target has 10 bits.

FIG. 9 depicts luminance level values in the case of 8 bits and in the case of 10 bits. In the case of 10 bits, a level lower than "10'h040" is an undershoot level. In this case, a range of "10'h040" to LT can be set as a lower-level region.

Also, the conversion value can be set as "10'h040", for example.

Furthermore, the conversion value may be set at a certain specific value in both cases of 8 bits and 10 bits. It is suitable that the conversion value has a value among the luminance data values included in the lower-level region.

When the lower-level region is set as "8'h10" to "8'h17", any one of "8'h10", "8'h11", . . . , "8'h17" is taken as the conversion value.

While the video compressing apparatus 1 for use in the authoring system has been described in the above embodiments, the embodiments of the present invention can be applied to various devices for image processing. For example, an image reproducing apparatus, an imaging apparatus, a communicating apparatus, an image recording apparatus, a game machine, and a video editor can be assumed.

Furthermore, as a matter of course, the video compressing apparatus 1 can be assumed to be implemented in a general-purpose personal computer, a portable telephone, personal digital assistant (PDA), and other various information processing apparatuses using image data.

For example, by providing the program causing the operation processing apparatus to execute the processes of FIG. 4 as image processing application software, appropriate image processing can be implemented on a personal computer or the like as a process before compression.

The program in an embodiment of the present invention causes an operation processing apparatus to execute a step of detecting, in luminance data of input video signal, luminance data corresponding to a value in a set lower-level region and a step of converting a value of the luminance data corresponding to the lower-level region to a set conversion value. By providing this program, suitable image processing can be performed as a preprocess for data compression in various devices. With this program, the signal processing method in an embodiment of the present invention can be performed by the personal computer.

The program described above can be recorded in advance on an HDD as a recording medium incorporated in a device, such as a personal computer, or a ROM, a flash memory, or the like in a microcomputer having a CPU.

Also, the program can be temporarily or permanently stored in (recorded on) a removable recording medium, such as a flexible disk, a compact disc read only memory (CD-ROM), magnet optical (MO) disk, a DVD, a BD, a magnetic disk, a semiconductor memory, or a memory card. Such a removable recording medium can be provided as so-called packaged software.

Furthermore, the program can be installed from a removable recording medium to a personal computer or the like, and can also be downloaded from a download site via a network, such as a local area network (LAN) or the Internet.

The present application contains subject matter related to that disclosed in Japanese Priority Patent Application JP 2009-093924 filed in the Japan Patent Office on Apr. 8, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus comprising:
 a lower-level region data detecting section operable to detect, in luminance data of a video signal, luminance data corresponding to a value in a lower-level region, wherein the lower-level region corresponds to a region of the luminance data of the video signal excluding an undershoot region of the luminance data of the video signal; and
 a data converting section operable to convert a value of the luminance data corresponding to the lower-level region to a conversion value.

2. The signal processing apparatus according to claim 1, wherein when the lower-level region data detecting section detects a predetermined number or more of pieces of the luminance data corresponding to the lower-level region in a predetermined unit of the luminance data of the video signal, the data converting section converts athe value of the luminance data corresponding to the lower-level region in the predetermined unit of the luminance data of the video signal to the conversion value.

3. The signal processing apparatus according to claim 2, wherein the luminance data corresponding to the lower level region is set to have a lower value in a predetermined range, wherein the predetermined range excludes values of luminance data corresponding to the undershoot region of the luminance data.

4. The signal processing apparatus according to claim 2, wherein the conversion value is a value among luminance data values included in the lower-level region.

5. The signal processing apparatus according to claim 2, wherein the predetermined unit is a horizontal line unit configuring a frame of the video signal.

6. The signal processing apparatus according to claim 1, wherein, for luminance data of a part of a screen region in a frame of the video signal, the lower-level region data detecting section detects the luminance data corresponding to the value in the lower-level region and the data converting section converts a value of the luminance data corresponding to the lower-level region to the conversion value.

7. The signal processing apparatus according to claim 1, further comprising a compressing section operable to compress the luminance data output from the data converting section.

8. A signal processing method comprising:
 detecting, in luminance data of a video signal, luminance data corresponding to a value in a lower-level region, wherein the lower-level region corresponds to a region of the luminance data of the video signal excluding an undershoot region of the luminance data of the video signal; and
 converting a value of the luminance data corresponding to the lower-level region to a conversion value.

9. A program causing an operation processing apparatus to perform a process comprising:
 detecting, in luminance data of a video signal, luminance data corresponding to a value in a lower-level region, wherein the lower-level region corresponds to a region of the luminance data of the video signal excluding an undershoot region of the luminance data of the video signal; and
 converting a value of the luminance data corresponding to the lower-level region to a conversion value.

* * * * *